United States Patent
Lee

(10) Patent No.: US 9,853,566 B2
(45) Date of Patent: Dec. 26, 2017

(54) SYSTEM FOR DRIVING INVERTERS IN PARALLEL

(71) Applicant: LSIS CO., LTD., Gyeonggi-do (KR)

(72) Inventor: Bong-Ki Lee, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/166,172

(22) Filed: May 26, 2016

(65) Prior Publication Data

US 2016/0352250 A1 Dec. 1, 2016

(30) Foreign Application Priority Data

Jun. 1, 2015 (KR) .................. 10-2015-0077579

(51) Int. Cl.
| | | |
|---|---|---|
| *H02M 7/44* | (2006.01) | |
| *H02M 1/08* | (2006.01) | |
| *H02M 7/493* | (2007.01) | |
| *H02M 7/5387* | (2007.01) | |
| *H02M 1/00* | (2006.01) | |

(52) U.S. Cl.
CPC ............ *H02M 7/44* (2013.01); *H02M 1/08* (2013.01); *H02M 7/493* (2013.01); *H02M 7/53871* (2013.01); *H02M 2001/0025* (2013.01)

(58) Field of Classification Search
CPC .......... H02M 7/44; H02M 1/08; H02M 7/493
See application file for complete search history.

(56) References Cited

U.S. PATENT DOCUMENTS

| | | |
|---|---|---|
| 5,257,180 A | 10/1993 | Sashida et al. |
| 9,236,814 B2 | 1/2016 | Kaneko |
| 9,407,145 B1 * | 8/2016 | Burstein ............. H02M 3/1584 |
| 2013/0163297 A1 * | 6/2013 | Phadke ..................... H02J 3/26 363/65 |
| 2015/0138855 A1 | 5/2015 | Park |

(Continued)

FOREIGN PATENT DOCUMENTS

| | | |
|---|---|---|
| EP | 2874302 A2 | 5/2015 |
| EP | 2876797 A2 | 5/2015 |
| JP | 1996-084260 B2 | 1/1996 |

(Continued)

OTHER PUBLICATIONS

Zheng, Weifang, et al. "Modeling, Analysis, and Implementation of Real Time Network Controlled Parallel Multi-Inverter Systems"; Power Electronics Institute, College of Electrical Engineering, Zhejiang Unversity; Hang Zhou, China; 2012 IEEE 7th International Power Electronics and Motion Control Conference; Jun. 2-5, 2012.

(Continued)

*Primary Examiner* — Emily P Pham

(74) *Attorney, Agent, or Firm* — Nath, Goldberg & Meyer; Jerald L. Meyer; Stanley N. Protigal

(57) ABSTRACT

In some embodiments, a system for driving inverters in parallel includes a master controller, a plurality of slave controllers, and a plurality of inverters controlled correspondingly by each of the slave controllers. The system may further include a control signal creation unit to create control signals for the slave controllers by using data transmitted and received between the master controller and the slave controllers to enable the plurality of inverters to create balanced output currents.

8 Claims, 6 Drawing Sheets

(56) References Cited

U.S. PATENT DOCUMENTS

2016/0218618 A1* 7/2016 Yin ...................... H02M 3/155
2016/0294313 A1* 10/2016 Chassard ................. H02P 9/30

FOREIGN PATENT DOCUMENTS

| | | |
|---|---|---|
| JP | H08331854 A | 12/1996 |
| JP | H9-331682 A | 12/1997 |
| JP | 2008-086127 A | 4/2008 |
| JP | 2013-118743 A | 6/2013 |
| JP | 2013-240252 A | 11/2013 |
| JP | 2015-100262 A | 5/2015 |
| KR | 96-0000802 B1 | 1/1996 |
| KR | 20090096841 A | 9/2009 |
| KR | 10-1361940 B1 | 2/2014 |
| KR | 101361940 B1 | 2/2014 |
| KR | 10-1491933 B1 | 2/2015 |

OTHER PUBLICATIONS

European Search Report dated Oct. 20, 2016 corresponding to application No. 16169573.9-1809.
Korean Notice of Allowance dated Jan. 1, 2017 corresponding to application No. 10-2015-0077579.
Korean Office Action dated Aug. 9, 2016, in 4 pages.
Japanese Office Action dated Jul. 25, 2017 in connection with the counterpart Japanese Patent Application No. 2016-109913.

\* cited by examiner (PRIOR ART)

(a) Iu, M < Iu,avg (b) Iu,M > Iu,avg

SYSTEM FOR DRIVING INVERTERS IN PARALLEL

CROSS REFERENCE TO RELATED APPLICATIONS

This application claims the benefit of Korean Patent Application No. 10-2015-0077579, filed on Jun. 1, 2015, which is hereby incorporated by reference in its entirety.

TECHNICAL FIELD

The present disclosure relates to a system for driving inverters in parallel, and more particularly to a system for driving inverters in parallel, in which a plurality of inverters are driven in parallel, to improve operation efficiency by correcting output current unbalance between inverters in the system.

BACKGROUND

Theoretically, it is possible to drive inverters independently in all capacity ranges. However, when an environment which is not smaller than hundreds of kW is designed for a method for driving inverters independently, usefulness of the design is significantly lowered due to various issues including the limit to power semiconductor devices and restrictions by apparatus design. Therefore, to overcome the issues, inverters which have a capacity higher than a given value are conventionally designed in a method for driving a plurality of inverters with a capacity smaller than a design capacity in parallel.

Driving a plurality of inverters in parallel may be controlled in various methods. The most common method among the methods is to install a single master controller and a plurality of slave controllers to control the whole system through communication between them.

However, if this method is used, output current unbalance may occur between the inverters, which may be caused by different variables, for example, time differences that may occur by communication between the master controller and the slave controllers, the difference in power semiconductor features for the respective inverters, and time differences that occur between power semiconductor driving circuits installed in each inverter.

That is to say, although N inverters are driven with the same 3-phase PWM (Pulse Width Modulation) signals, a small difference may occur between output currents of each inverter Iu, Iv and Iw. As a result, it is essential to consider a sufficient reserve capacity when designing a system for driving inverters in parallel.

FIG. 1 is an exemplary graph illustrating the state of inverter output current unbalance in a conventional system for driving inverters in parallel.

Referring to FIG. 1, a small phase difference is shown among output currents Iu1, Iu2 and IuN of the N inverters. Because of such a difference, the sum of each inverter output does not match the whole system output in a system for driving inverters in parallel. For example, when designing power supply of 600 kW with three inverters, it is essential to design power supply by connecting three inverters of a capacity even bigger than 200 kW in parallel for safety reasons.

That is, it is essential to consider the derating factor K for driving the inverters in parallel. In particular, as more inverters are connected in parallel, K becomes smaller. Therefore, inverters of even bigger capacity than the capacity of inverters theoretically calculated are required. This is expressed with the following Equation 1.

$$P\text{tot} = K \times N \times P\text{inv} \qquad \text{<Equation 1>}$$

where Ptot is total output power; K is a derating factor, $0 < K \leq 1$ (in inverse proportion to the number N of inverters connected in parallel; and Pinv is the capacity of each inverter connected in parallel. Therefore, there is a need to provide a new method for designing and operating a more efficient system by correcting the aforementioned output current unbalance of inverters driven in parallel.

SUMMARY

In view of the above, some embodiments of the present disclosure provide a system for driving inverters in parallel, in which a plurality of inverters are driven in parallel, for improving operation efficiency by correcting output current unbalance among the inverters in the system for driving the inverters in parallel.

The aforementioned problem to be solved by some embodiments of the present disclosure are not limited to thereto, and other problems and advantages of some embodiments of the present disclosure not described above will be understood through the following description, and further apparent in the embodiments of the present disclosure. In addition, it should be noted that the problems and advantages of some embodiments of the present disclosure may be readily realized by the means and their combinations stated in the following claims.

According to one embodiment of the present disclosure, there is provided a system for driving inverters in parallel, the system including:

a master controller;

a plurality of slave controllers;

a plurality of inverters controlled correspondingly by each of the slave controllers; and a control signal creation unit configured to generate or create control signals for the slave controllers by using data transmitted and received between the master controller and the slave controllers to enable the plurality of inverters to generate or create balanced output currents.

In the embodiment, the control signal creation unit includes:

an input adder configured to find a difference between an average value of each of each of the 3-phase output currents of the plurality of inverters and each of 3-phase output current of each of the inverters;

a proportional-integral (PI) controller configured to perform proportional-integral control on the output values of the input adder;

a current proportioning unit configured to perform proportioning on the output values of the proportional-integral controller to differentiate a compensation range for each phase of currents;

a limiter configured to perform limiting on the output values of the current proportioning unit to limit the difference from the average values of the 3-phase output currents; and an output adder configured to add up pulse width information of the 3-phase output currents to the output values of the limiter, wherein the proportional-integral controller is configured to find the sum of a value by multiplying the output values of the input adder by a proportional factor $K_p$, and a value by multiplying an integrating factor $K_i$ by the integrated value of the output values of the input adder.

In the embodiment, the current proportioning unit is configured to find a value obtained by multiplying the output values of the proportional-integral controller by the value obtained by dividing an output current value of a concerned phase of each of the inverters by an average current peak value.

In addition, the limiter is configured to output the output values of the current proportioning unit when the output values of the current proportioning unit lie between an upper limit value and a lower limit value predetermined by the limiter; configured to output the upper limit value predetermined by the limiter when the output values of the current proportioning unit are greater than the upper limit value; and configured to output the lower limit value predetermined by the limiter when the output values of the current proportioning unit are smaller than the lower limit value.

In addition, the output adder is configured to find the sum of the pulse width values of the 3-phase output currents of each of the inverters and the output values of the limiter.

According to another embodiment of the present disclosure, there is provided a method of implementing a balanced output current for use in a system for driving inverters in parallel, the method including:

an input adding process to find a difference between an average value of each of 3-phase output currents of the plurality of inverters and each of 3-phase output currents of each of the inverters;

a proportional-integral control process to perform proportional-integral control on the output values at the input adding process;

a current proportioning process to perform proportioning on the output values at the proportional-integral control process to differentiate a compensation range for each phase of currents;

a limiting process to perform limiting on the output values at the current proportioning process to limit the difference from the average values of the 3-phase output currents; and an output adding process to add up pulse width information of the 3-phase output currents to the output values at the limiting process, wherein the proportional-integral control process is to find the sum of a value by multiplying the output values at the input adding process by a proportional factor $K_p$, and a value by multiplying an integrating factor $K_i$ by the integrated value of the output values at the input adding process.

In the embodiment, the current proportioning process is to find a value obtained by multiplying the output values at the proportional-integral control process by the value obtained by dividing an output current value of a concerned phase of each of the inverters by an average current peak value.

In addition, the limiting process is to output the output values at the current proportioning process when the output values at the current proportioning process lie between an upper limit value and a lower limit value at the limiting process; to output the upper limit value at the limiting process when the output values at the current proportioning process are greater than the upper limit value; and to output the lower limit value at the limiting process when the output values at the current proportioning process are smaller than the lower limit value.

In addition, the output adding process is to find the sum of the pulse width values of the 3-phase output currents of the each of the inverters and the output values at the limiting process.

In accordance with some embodiments of the present disclosure described above, the system for driving inverters in parallel enables each inverter which is a component of the system to output balanced current each other. This contributes to providing the effect of efficient design and operation of the system for driving inverters in parallel, configured by connecting a plurality of inverters.

DETAILED DESCRIPTION

Figure 1:
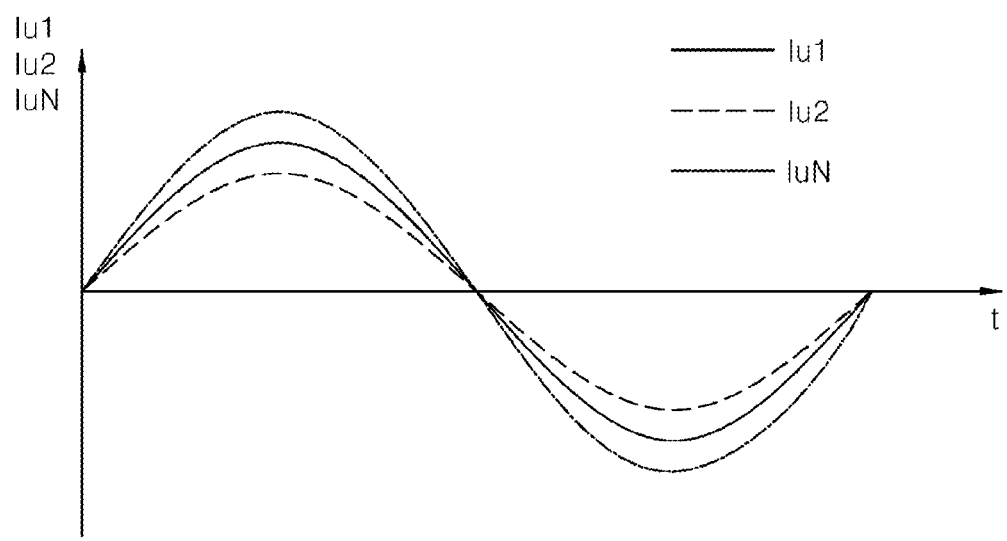
FIG. 1 is an exemplary graph illustrating the state of inverter output current unbalance in a conventional system for driving inverters in parallel, according to the prior art.

Hereinafter, the aforementioned problems, features and advantages of some embodiments of the present disclosure will be described in detail with reference to the accompanying drawings, and those skilled in the art of some embodiments of the present disclosure may thus implement the technical idea of some embodiments of the present disclosure easily. It should be noted that specific description about known technology related to some embodiments of the present disclosure is omitted if it may unnecessarily obscure the gist of some embodiments of the present disclosure while describing some embodiments of the present disclosure.

Hereinafter, preferred embodiments of the present disclosure are described in detail with reference to the accompanying drawings. The same reference numerals denote the same or equivalent components in the drawings.

Figure 2:
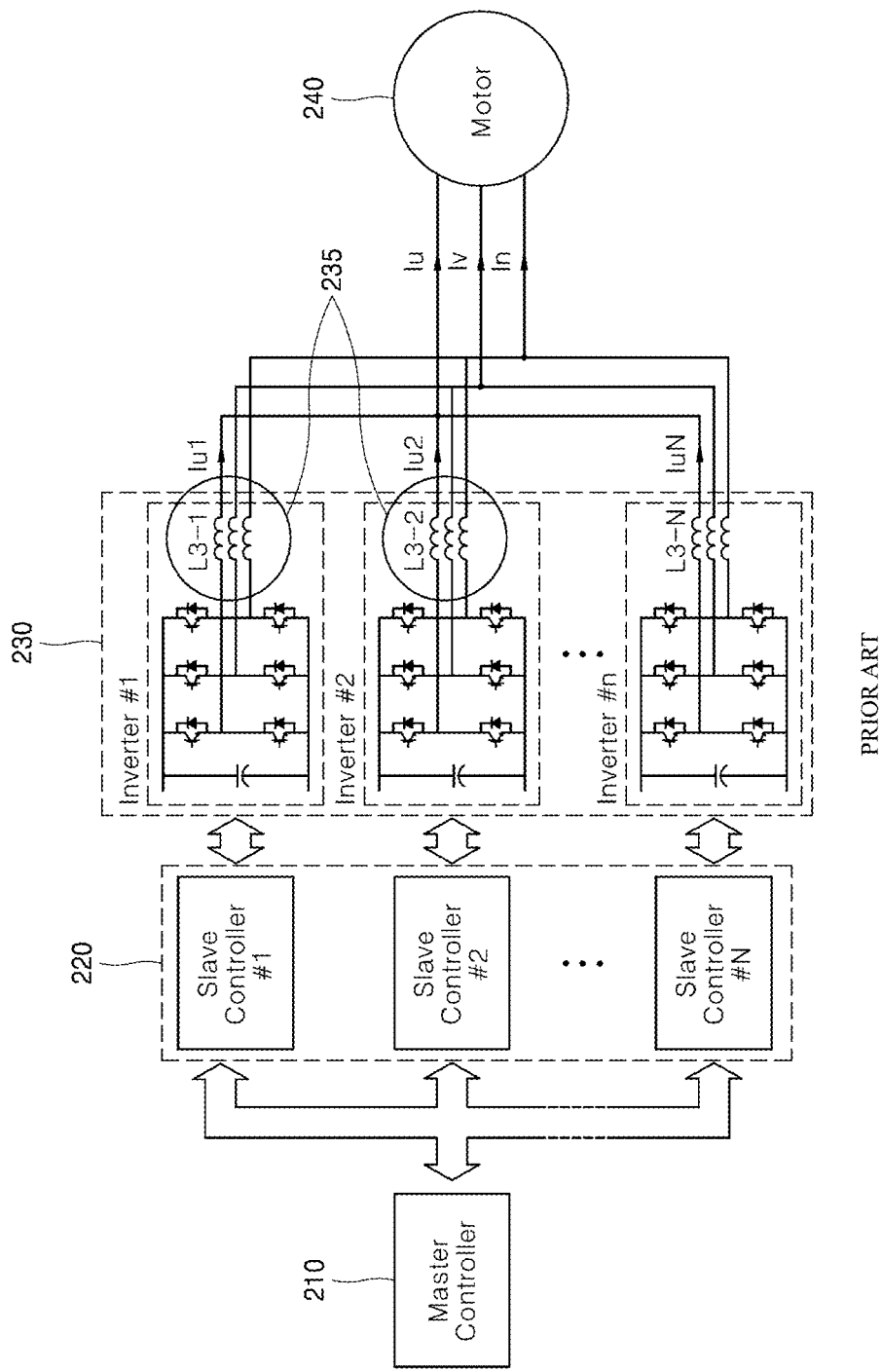
FIG. 2 illustrates the configuration of a conventional system for driving inverters in parallel, according to the prior art.

FIG. 2 illustrates the configuration of a conventional system for driving inverters in parallel.

Referring to FIG. 2, the conventional system for driving inverters in parallel includes a single master controller 210, N slave controllers 220, N inverters 230 connected to each of the slave controllers 220, a 3-phase inductor 235 for attenuating output current waveform distortion of each inverter, and a motor 240 driven by driving the N inverters 230 in parallel. In operation, when the same 3-phase PWM signals are applied to each of the N inverters 230 to drive them in parallel as shown in FIG. 2, output power of each inverter is in charge of 1/N the power applied to the motor 240. Therefore, it is possible to drive a motor of large capacity by driving a plurality of inverters of small capacity in parallel.

In this case, however, total power 'Ptot' generated from the entire inverters is not [N×Pinv (referred to capacity of each inverter)] which is a theoretical numerical value, but [K (referred to a derating factor)×N×Pinv]. This is described above with equation 1.

That is, the current component of 3-phases u, v and w output from each inverter 230 is integrated to form the total current Iu, Iv and Iw. However, when forming the current of each phase, there may be a small phase difference depending on inverters which output the current and it is inevitable that derating then occurs. For example, exemplifying the Iu component, while total Iu is determined by the sum of the total current Iu1 of the inverter #1, the total current Iu2 of the inverter #2 . . . , and the total current IuN of the inverter #N, each of the total currents Iu1, Iu2 . . . , and IuN is not able to form its waveform which accurately matches as shown in FIG. 1. This also applies to the Iv and Iw components, and suggests that it is essential to consider enough reserve capacity to design a system for driving inverters in parallel.

Figure 3:
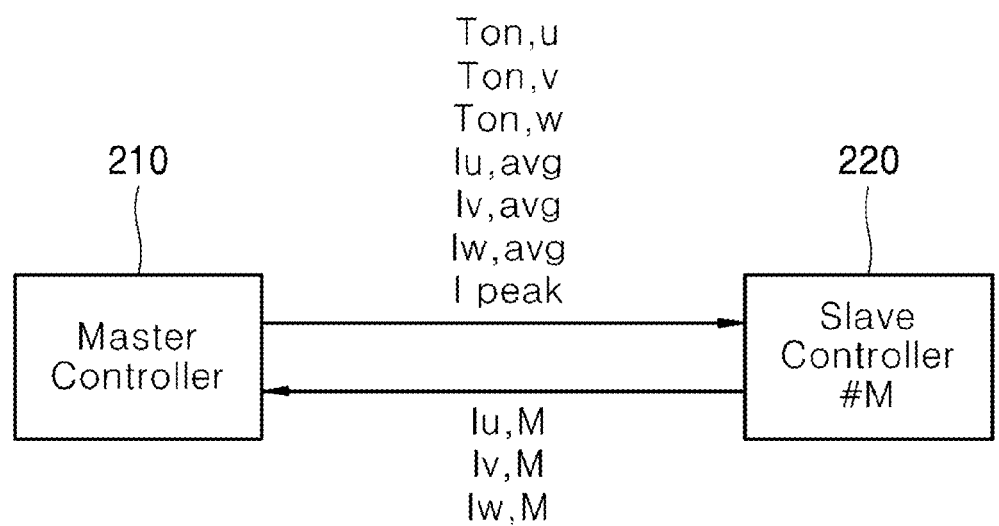
FIG. 3 illustrates the concept of communication information between the master controller and the slave controllers shown in FIG. 2, according to the prior art.

FIG. 3 illustrates the concept of communication information between the master controller and the slave controllers shown in FIG. 2.

Referring to FIG. 3, it is seen that various information is sent and received between the master controller 210 and the slave controller 220. First, exemplary information sent from the master controller 210 to the slave controller 220 includes pulse width information Ton,u/Ton,v/Ton,w of 3-phase current, average value information Iu,avg/Iv,avg/Iw,avg of inverter output current, and average peak value information Ipeak of the current.

In addition, exemplary information sent from the slave controller 220 to the master controller 210 includes 3-phase output current value information Iu,M/Iv,M/Iw,M for the inverter #M.

Hereinafter, the configuration of a control signal creation unit installed in the system of some embodiments of the present disclosure for driving inverters in parallel is described for controlling output signals of each of the slave controller 220 by creating compensating signals for controlling the output current of each phase to be balanced between the inverters being driven in parallel by using just the aforementioned information sent between the master controller 210 and the slave controller 220.

Figure 4:
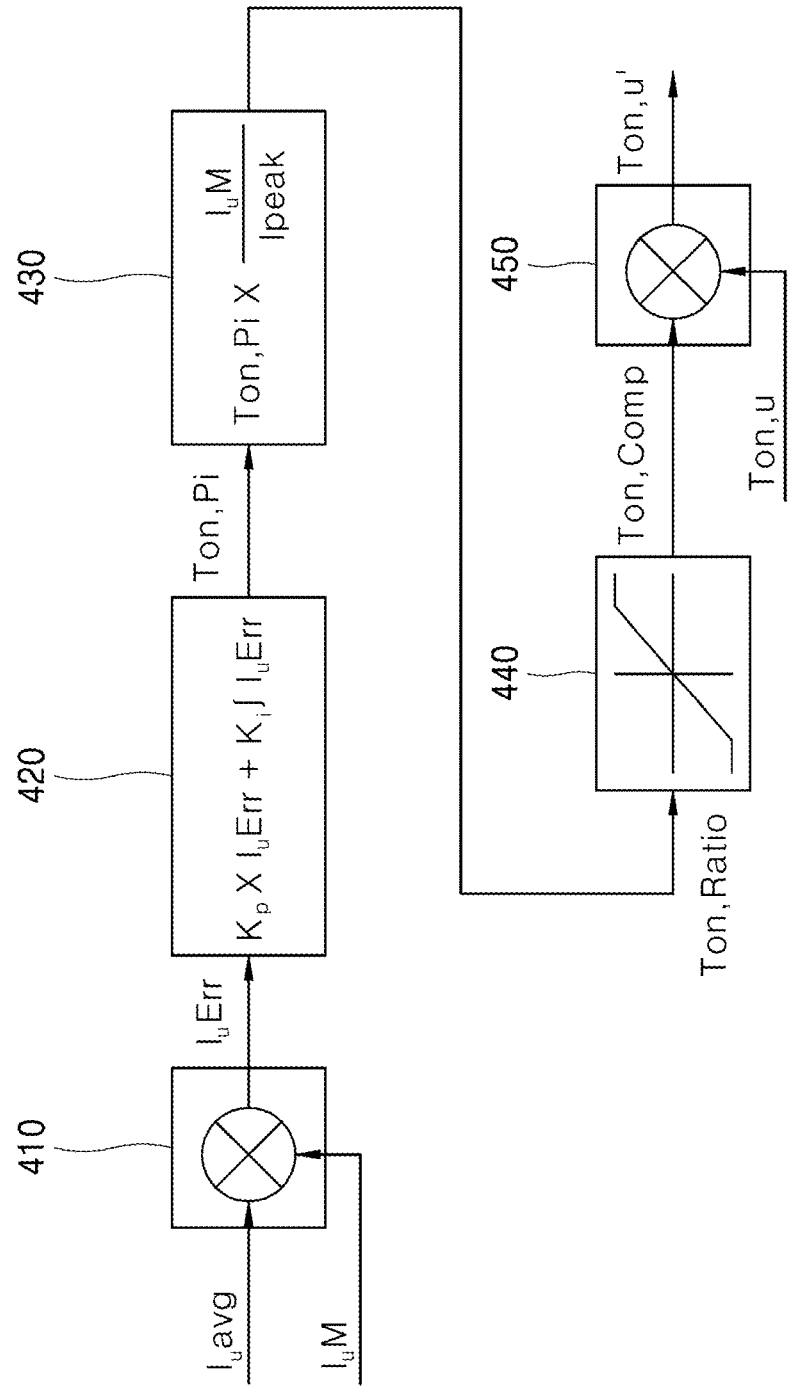
FIG. 4 illustrates a control signal creation unit installed in a system for driving inverters in parallel in accordance with an embodiment of the present disclosure.

FIG. 4 illustrates the configuration of a control signal creation unit installed in a system for driving inverters in parallel in accordance with an embodiment of the present disclosure.

Referring to FIG. 4, the control signal creation unit of the system for driving inverters in parallel in accordance with an embodiment of the present disclosure includes an input adder 410, a proportional-integral controller 420, a current proportioning unit 430, a limiter 440, and an output adder 450.

Hereinafter, for the sake of easy understanding, a process of controlling output currents of the #M inverter for the U-phase output current Iu among 3-phase currents is described as an example. Therefore, it should be noted that this process is applicable to any inverter which produces a V- or W-phase output current and which is a component of a system for driving inverters in parallel.

The input adder 410 finds the difference between the average value information of inverter output currents which is part of information sent from the master controller 210 to the slave controller 220, and the inverter output current value information which is part of information sent from the slave controller 220 to the master controller 210. More specifically, the input adder 410 receives the average value information $I_u$,avg of the U-phase output currents sent from the master controller 210 and the U-phase output current value information $I_u$,M of the #M inverter sent from the slave controller 220 to find and then output the difference between them. Therefore, the output value $I_u$Err obtained from the input adder 410 is equivalent to the following equation 2.

$$I_u\text{Err}=I_u,\text{avg}-I_u,M \qquad \text{<Equation 2>}$$

The proportional-integral controller 420 carries out proportional-integral control for the output value $I_u$Err of the input adder 410. That is, it carries out the operation of the following Equation 3 by applying both the proportional factor $K_p$ and the integrating factor $K_i$, based on the derating factor K, with respect to the output value $I_u$Err of the input adder 410.

$$\text{Ton},Pi=K_p \times I_u,\text{Err}+K_i\int(I_u,\text{Err})dt \qquad \text{<Equation 3>}$$

That is, the proportional-integral controller 420 yields the output value Ton,Pi which is the sum of a value obtained by multiplying the output value $I_u$,Err of the input adder 410 by the proportional factor $K_p$ and a value obtained by multiplying the integral value of output value $I_u$,Err of the input adder 410 by the integrating factor $K_i$.

The current proportioning unit 430 performs a proportioning process, which is to differentiate the compensation range in consideration of each current phase, on the output value Ton,Pi of the proportional-integral controller 420, and the following Equation 4 is for the process.

$$\text{Ton,Ratio}=\text{Ton},Pi\times(I_u,M/\text{Ipeak}) \qquad \text{<Equation 4>}$$

That is to say, the output value Ton,Ratio of the current proportioning unit 430 is obtained by multiplying the output value Ton,Pi of the proportional-integral controller 420 by the value obtained by dividing the U-phase output current value $I_u$,M of the #M inverter by the average current peak value Ipeak. In this case, the U-phase output current value $I_u$,M information of the #M inverter can be obtained from the slave controller, and the average current peak value Ipeak information can be obtained from the master controller as described above.

The limiter 440 performs an limiting process on the output value Ton,Ratio of the current proportioning unit 430 to limit the difference between the 3-phase output current value of a concerned inverter and the average 3-phase output current value. That is, if the difference between the U-phase output current value $I_u$,M of the #M inverter and the average U-phase output current value $I_u$,avg is too big, burning damage may occur in the inverter. Therefore, a limiting value is given to avoid the two values to be different by more than a given level to prevent the burning damage in the inverter. The operation by the limiter 440 contributes to obtaining the following compensating pulse width Ton,Comp.

Ton,Comp=Ton,Ratio (in which (−Ton,Limit)≤Ton,Ratio≤(+Ton,Limit))

Ton,Comp=+Ton,Limit (in which Ton,Ratio>(+Ton,Limit))

Ton,Comp=−Ton,Limit (in which Ton,Ratio<(−Ton,Limit)) <Equation 5>

That is, a compensating pulse width value Ton,Comp required for the U-phase output current value $I_u$,M of the #M inverter is determined as the aforementioned process result of the limiter 440. The U-phase output current pulse width Ton,u' of the #M inverter is finally determined by calculating the compensating pulse width values and the pulse width values of the 3-phase currents as described above. This process is carried out through the output adder 450 and the following Equation 6 is for the process.

$$Ton,u' = Ton,u + Ton,Comp \qquad \text{<Equation 6>}$$

That is to say, the compensating pulse width value Ton, Cmp is calculated through the process of FIG. 4 and the above Equations for the U-phase output current pulse width Ton,u information sent from the master controller to the slave controller. In addition, since a corrected U-phase output current pulse width Ton,u' information is calculated by the use of the value Ton,Comp, each of the slave controllers may control each of their corresponding inverters through the PWM control signals corresponding to the corrected information.

Therefore, balancing output currents through the aforementioned compensation for each of 3-phase currents of each of the inverters contributes to maximizing efficient use of output of the inverters connected in parallel.

Figure 5:
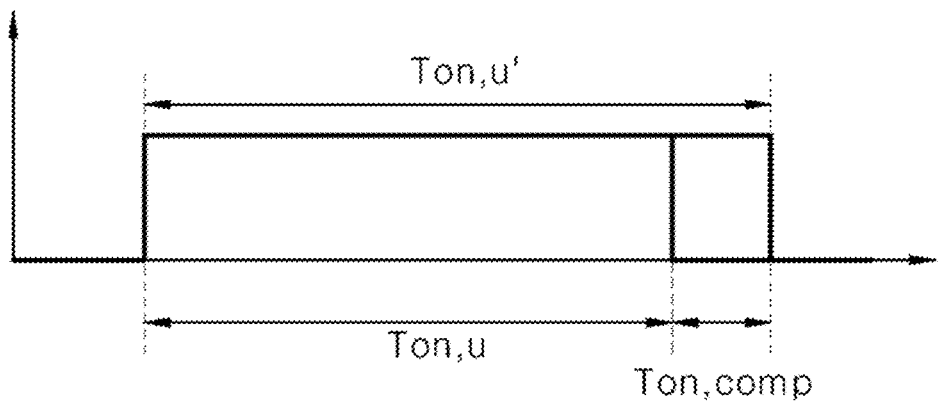
FIG. 5 is an exemplary process of controlling output currents with the unit shown in FIG. 4, in accordance with an embodiment of the present disclosure.
Figure 5:
Figure 5:
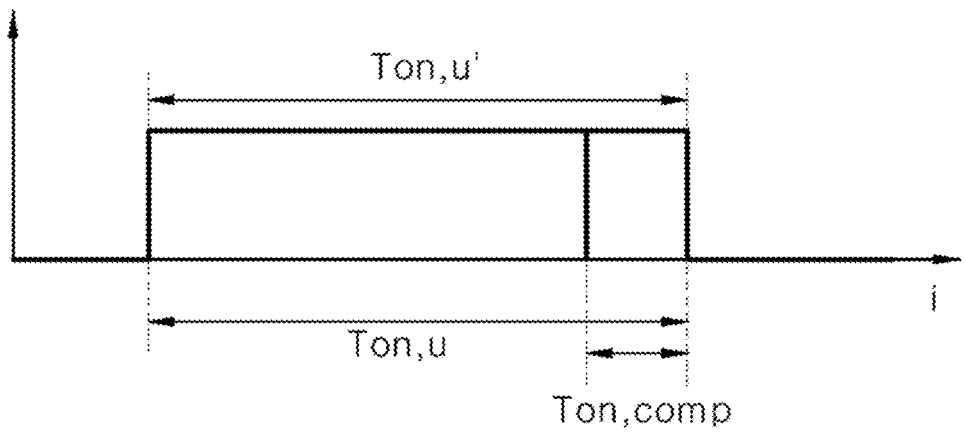

FIG. 5 is an exemplary process of controlling output currents to illustrate FIG. 4, and PWM output waveform of the slave controller for controlling the U-phase output current of the #M inverter.

Referring to FIG. 5, (a) when the U-phase output current value $I_u$,M of the #M inverter is smaller than the average U-phase output current value $I_u$,avg, the compensating pulse width value Ton,Comp is added to the U-phase output current pulse width Ton,u to make the slave controller have a corrected U-phase output current pulse width Ton,u'.

On the contrary, (b) when the U-phase output current value $I_u$,M of the #M inverter is greater than the average U-phase output current value Iu,avg, the value as much as the compensating pulse width value Ton,Comp is subtracted from the U-phase output current pulse width Ton,u to make the slave controller have a corrected U-phase output current pulse width Ton,u'.

Therefore, compensating each 3-phase output current value of any inverter as described above contributes to making all output current values of all inverters follow the average output current value thereof, and controlling output currents of the system for driving inverters in parallel to be balanced.

For a reference, in the embodiment and drawings of the present disclosure described above, the process of controlling output currents of the #M inverter for the U-phase output current $I_u$ among 3-phase currents has been described as an example for the sake of convenience. However, it should be noted that embodiments of the present disclosure is not limited to the example, and it will be apparent to those skilled in the art of some embodiments of the present disclosure that the process may be applied to any inverter which is a component of a system for driving inverters in parallel and each-phase current which is a component of 3-phase currents.

Figure 6:
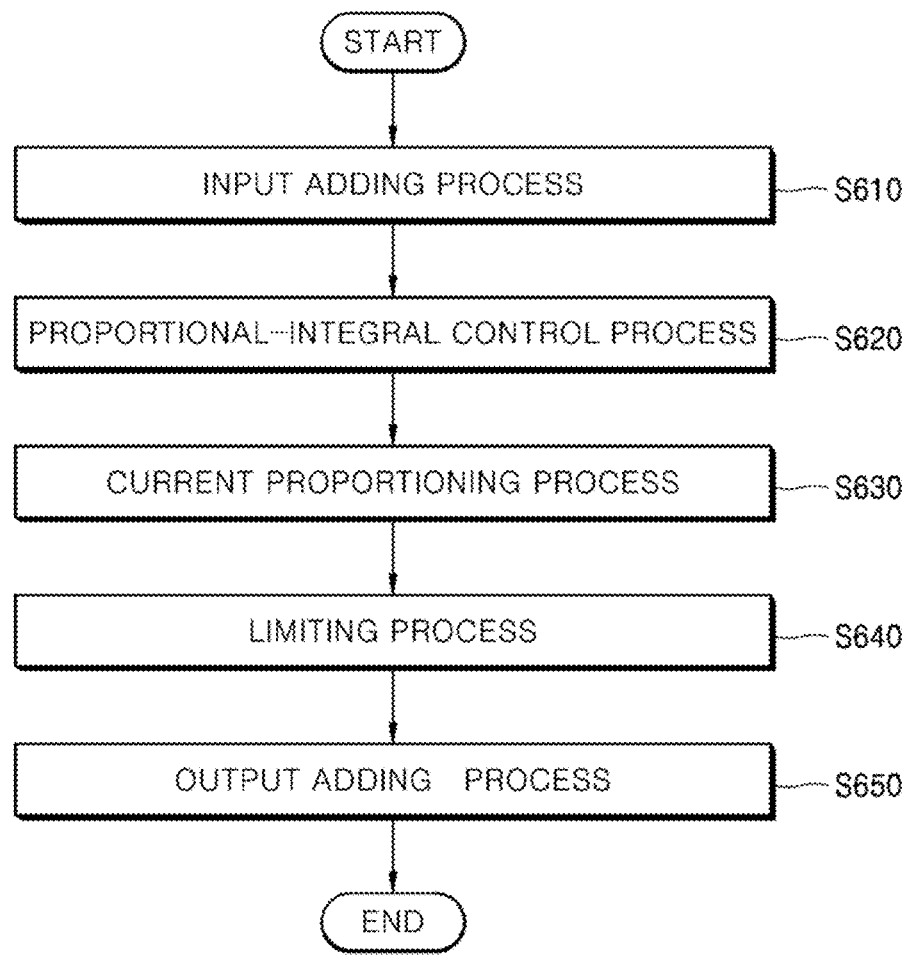
FIG. 6 is a flow chart illustrating a method of controlling output currents of a system for driving inverters in parallel, in accordance with an embodiment of the present disclosure.

FIG. 6 is a flow chart showing a method for controlling output currents of a system for driving inverters in parallel to be balanced in accordance with an embodiment of the present disclosure.

Referring to FIG. 6, the method for controlling output currents of the system for driving inverters in parallel to be balanced in accordance with an embodiment of the present disclosure includes an input adding process S610, a proportional-integral control process S620, a current proportioning process S630, a limiting process S640, and a output adding process S650.

The input adding process S610 is an operation of finding a difference between the average output current value information of an inverter and the output current value information of the inverter, where a difference between the average value of each of 3-phase output currents of a plurality of inverters and each of the 3-phase output currents of the respective inverters is founded and outputted.

The proportional-integral control process S620 is an operation of performing a proportional-integral control on the output values at the input adding process S610, where the proportional factor $K_p$ and the integrating factor based on the derating factor K, is applied to the output values at the input adding process.

The current proportioning process S630 is an operation of proportioning currents for differentiating a compensating range for each phase of current with respect to the output values at the proportional-integral control process S620. This process may be composed of multiplying the output values at the proportional-integral control process by the values obtained by dividing 3-phase output current values of the inverters by the average current peak value Ipeak of the inverters.

The limiting process S640 is an operation of limiting the output values at the current proportioning process S630 in order to limit the difference between the 3-phase output current values and an average current value thereof. Specifically, when the output value at the current proportioning process S630 lies between any upper limit value and any lower limit value, the concerned output value is used as it is. However, when it is greater than the upper limit value, the upper limit value is applied, and the lower limit value is applied when it is smaller than the lower limit value, instead of the output value.

The output adding process S650 is an operation of adding up the pulse width information of the 3-phase output currents to the output values at the limiting process S640. Through this process, all output current values of all inverters follow the average output current value of each output current value, which contributes to controlling output currents of the system for driving inverters in parallel to be balanced.

Reference should be made to the drawings, equations or detailed description about them for the specific description or operation processes about each configuration operation.

Through the process described above, some embodiments of the present disclosure may have the effect of controlling output currents of each phase to be balanced for each inverter just by sending and receiving information between a master controller and a slave controller in a system for driving N inverters in parallel. Controlling output currents to be balanced means that N inverters being driven in parallel are in charge of the same power. Therefore, applying some embodiments of the present disclosure contributes to providing various advantages including simplified design of a system for driving inverters in parallel, and furthermore to configuring an optimized efficient system.

In addition, with some embodiments of the present disclosure described above, balanced current output is enabled among inverters each of which is a component of a system for driving inverters in parallel. Therefore, another effect of some embodiments of the present disclosure is efficient design and operation of a system for driving inverters in parallel, configured by connecting a plurality of inverters.

Those skilled in the art of some embodiments of the present disclosure may replace, change and modify the present disclosure described above within the scope of the technical idea of some embodiments of the present disclosure. Therefore, the present disclosure is not limited to the embodiments described above and accompanying drawings.

What is claimed is:

1. A system for driving inverters in parallel, the system comprising:
   a master controller;
   a plurality of slave controllers;
   a plurality of inverters configured to be controlled correspondingly by each of the slave controllers; and
   a control signal creation unit configured to generate control signals for the slave controllers by using data sent and received between the master controller and the slave controllers to enable the plurality of inverters to generate balanced output currents,
   wherein the control signal creation unit comprises:
   an input adder configured to find a difference between an average value of each of the 3-phase output currents of the plurality of inverters and each of the 3-phase output currents of the plurality of inverters;
   a proportional-integral (PI) controller configured to perform proportional-integral control on output values of the input adder;
   a current proportioning unit configured to perform proportioning on output values of the proportional-integral controller to differentiate a compensation range for each phase of currents;
   a limiter configured to perform limiting on output values of the current proportioning unit to limit the difference between the average value of each of the 3-phase output currents and each of the 3-phase output currents; and
   an output adder configured to add up pulse width information of the 3-phase output currents to output values of the limiter.

2. The system of claim 1, wherein the proportional-integral controller is configured to find a sum of a value obtained by multiplying the output values of the input adder by a proportional factor $K_p$, plus a value obtained by multiplying an integrating factor $K_i$, by an integrated value of the output values of the input adder.

3. The system of claim 1, wherein the current proportioning unit is configured to find a value obtained by multiplying the output values of the proportional-integral controller by a value obtained by dividing an output current value of a concerned phase of the plurality of inverters by an average current peak value.

4. The system of claim 2, wherein the current proportioning unit is configured to find a value obtained by multiplying the output values of the proportional-integral controller by a value obtained by dividing an output current value of a concerned phase of the plurality of inverters by an average current peak value.

5. The system of claim 1, wherein:
   the limiter is configured to output the output values of the current proportioning unit when the output values of the current proportioning unit lie between an upper limit value and a lower limit value predetermined by the limiter;
   the limiter is configured to output the upper limit value predetermined by the limiter when the output values of the current proportioning unit are greater than the upper limit value; and
   the limiter is configured to output the lower limit value predetermined by the limiter when the output values of the current proportioning unit are smaller than the lower limit value.

6. The system of claim 2, wherein:
   the limiter is configured to output the output values of the current proportioning unit when the output values of the current proportioning unit lie between an upper limit value and a lower limit value predetermined by the limiter;
   the limiter is configured to output the upper limit value predetermined by the limiter when the output values of the current proportioning unit are greater than the upper limit value; and
   the limiter is configured to output the lower limit value predetermined by the limiter when the output values of the current proportioning unit are smaller than the lower limit value.

7. The system of claim 1, wherein the output adder is further configured to find a sum of pulse width values of the 3-phase output currents of the plurality of inverters plus the output values of the limiter.

8. The system of claim 2, wherein the output adder is further configured to find a sum of pulse width values of the 3-phase output currents of the plurality of inverters plus the output values of the limiter.

* * * * *